(12) United States Patent  
Gray

(10) Patent No.: US 10,089,594 B2  
(45) Date of Patent: Oct. 2, 2018

(54) SYSTEM AND METHOD FOR MONITORING THE COLD CHAIN INTEGRITY OF ENVIRONMENTALLY SENSITIVE PACKAGED GOODS

(71) Applicant: Ander Olaran Gray, Falcarragh (IE)

(72) Inventor: Ander Olaran Gray, Falcarragh (IE)

( * ) Notice: Subject to any disclaimer, the term of this patent is extended or adjusted under 35 U.S.C. 154(b) by 515 days.

(21) Appl. No.: 14/435,365

(22) PCT Filed: May 31, 2013

(86) PCT No.: PCT/EP2013/061329  
§ 371 (c)(1),  
(2) Date: Apr. 13, 2015

(87) PCT Pub. No.: WO2014/056636  
PCT Pub. Date: Apr. 17, 2014

(65) Prior Publication Data  
US 2015/0269518 A1    Sep. 24, 2015

(30) Foreign Application Priority Data

Oct. 12, 2012 (IE) ..................... 2012/0452

(51) Int. Cl.  
*G06Q 10/08* (2012.01)  
*G06K 19/07* (2006.01)  
(Continued)

(52) U.S. Cl.  
CPC .......... *G06Q 10/0832* (2013.01); *G01J 11/00* (2013.01); *G06K 19/0717* (2013.01);  
(Continued)

(58) Field of Classification Search  
CPC ............... G06Q 10/0832; G06Q 10/08; G06K 19/0717; G06K 19/07705; G06K 9/00771; H04B 10/116; H04N 7/181; G01J 11/00  
(Continued)

(56) References Cited

U.S. PATENT DOCUMENTS

RE36,200 E    4/1999  Berrian  
5,917,416 A  * 6/1999  Read ..................... G01K 3/005  
                                                   340/584

(Continued)

OTHER PUBLICATIONS

Design Engineering: Alarmingly Secure. (2003). Centaur Communications Ltd. The Engineer, p. 37. (Year: 2003).*

(Continued)

*Primary Examiner* — Kevin H Flynn  
*Assistant Examiner* — Hunter A Molnar  
(74) *Attorney, Agent, or Firm* — Brian J. Colandreo; Jeffrey T. Placker; Holland & Knight LLP

(57) ABSTRACT

This invention relates to a system and method for monitoring the cold chain integrity of at least one packet of environmentally sensitive goods. The system comprises a monitoring unit applied directly to the goods packet, the monitoring unit comprising an environmental sensor monitoring an environmental condition to which the goods are subjected to and an optical output device for conveying environmental condition data. The system further comprises a camera operable to capture the environmental condition data conveyed by the optical output device, a memory for storing the environmental condition data captured by the camera and a processor for analyzing the environmental condition data. The use of a camera allows for a very simple, robust and inexpensive optical output device (e.g. an LED) to be used. The arrangement reduces the equipment cost significantly thereby allowing application across a wider range of products and provides greater flexibility and possibility for analyzing the cold chain integrity.

22 Claims, 9 Drawing Sheets

(51) Int. Cl.
*H04B 10/116* (2013.01)
*G01J 11/00* (2006.01)
*G06K 19/077* (2006.01)

(52) U.S. Cl.
CPC ....... *G06K 19/07705* (2013.01); *G06Q 10/08* (2013.01); *H04B 10/116* (2013.01)

(58) Field of Classification Search
USPC ........................................................ 705/332
See application file for complete search history.

(56) References Cited

U.S. PATENT DOCUMENTS

| | | | | |
|---|---|---|---|---|
| 2003/0067386 A1* | 4/2003 | Skinner | ................ | G08B 25/006 340/540 |
| 2005/0119032 A1* | 6/2005 | Airas | .................... | H04M 1/021 455/566 |
| 2006/0176179 A1* | 8/2006 | Skorpik | ............. | G06K 19/0717 340/572.8 |
| 2007/0273507 A1* | 11/2007 | Burchell | ................ | G01K 1/024 340/539.27 |
| 2008/0043109 A1* | 2/2008 | Sim | .......................... | H04N 5/77 348/207.1 |
| 2010/0156640 A1* | 6/2010 | Forster | ................. | G06K 7/0008 340/572.1 |
| 2011/0115631 A1 | 5/2011 | Droesler | | |
| 2011/0202151 A1* | 8/2011 | Covaro | .............. | H05B 37/0272 700/90 |
| 2012/0175412 A1* | 7/2012 | Grabiner | ............... | G06F 19/327 235/375 |
| 2012/0274470 A1* | 11/2012 | Sandvick | ................ | G08B 5/36 340/584 |
| 2013/0069877 A1* | 3/2013 | Cha | ......................... | G06F 3/038 345/166 |

OTHER PUBLICATIONS

International Search Report issued in PCT/EP2013/061329 dated Sep. 2, 2013.

* cited by examiner

SYSTEM AND METHOD FOR MONITORING THE COLD CHAIN INTEGRITY OF ENVIRONMENTALLY SENSITIVE PACKAGED GOODS

CROSS-REFERENCE TO RELATED APPLICATIONS

The subject application is a U.S. National Stage application of International Application No. PCT/EP2013/061329, filed on 31 May 2013, which claims the priority of Ireland Patent Application No. 2012/0452, filed 12 Oct. 2012. The contents of both applications are herein incorporated by reference in their entirety.

TECHNICAL FIELD

This invention relates to a system and method for monitoring the cold chain integrity of environmentally sensitive packaged goods.

BACKGROUND ART

There are several different types of goods that must be stored in strictly controlled environmental conditions to prevent the goods becoming spoiled. For example, vaccines and many other types of medicaments must be stored at a relatively low temperature within a narrow temperature range. For example, it is not uncommon for many vaccines to be necessarily stored at a temperature of between 2° C. and 8° C. If the vaccines experience an ambient temperature outside of this range for a period of time, the vaccines efficacy will be adversely affected. Indeed, the vaccine may be spoiled entirely if it should experience temperatures outside of this range.

It is well known to closely monitor the refrigeration units in which the goods are stored in warehouses and other facilities and it is further well known to monitor the temperature of the vehicles or containers in which the goods are transported to and from the facilities. However, there are significant shortcomings with arrangements of this type. First of all, these systems monitor the temperature of the refrigeration unit or the vehicle as a whole and "hot spots" and "cold spots" outside the desired temperature range can occur within the unit or within the vehicle. Secondly, and perhaps more importantly, the known systems cannot, by and large, verify that the goods were within the given temperature range as the goods are often outside a refrigeration unit as they are loaded or unloaded onto a vehicle for transit. It is not uncommon therefore for some of the goods to be spoiled even though their monitoring history would suggest otherwise.

U.S. Pat. No. 8,332,240, entitled "Method and System for Tracking and Monitoring Vaccine and Pharmaceutical Information" in the name of Garver et al, overcomes many of the problems with the existing systems that monitor in bulk by applying a monitoring device to the individual packaged goods. In this way, the environment that the individual goods actually experienced is recorded rather than the environmental conditions that a bulk shipment of the goods, of which the goods in question were one, experienced. Furthermore, that record of the environmental conditions experienced by the goods is carried around with the goods and can be polled at a later date prior to consumption of the goods. Importantly, as the monitoring device is applied to individual packaged goods, the monitoring device will be able to determine more accurately whether or not there were any breaks in the cold chain and whether or not the cold chain integrity has been compromised.

Although far more effective than the previous systems, there are however still some problems with the types of systems described in U.S. Pat. No. 8,332,240. First of all, the cost of implementing such systems can be prohibitively expensive. The per-unit cost of the monitoring units applied to the packaging of the goods are prohibitively expensive for many applications. Secondly, the systems described require dedicated equipment to interrogate the monitoring devices and this equipment may not be readily available or it may not be financially practical to provide this equipment in the "last mile". Perversely, this is arguably where the validation of the cold chain integrity is needed the most, just prior to the goods being administered or consumed. Thirdly, the known devices can be relatively power hungry. Some goods have a relatively long shelf life and therefore the working life span of the battery powering the sensors and other equipment can become a problematic issue.

It is an object of the present invention to provide a system and method for monitoring the cold chain integrity of at least one packet of environmentally sensitive goods that overcome at least some of problems with the known systems and methods and that offer a useful choice to the consumer.

Many goods are sensitive to other environmental conditions including, but not limited to, humidity. However for the purposes of this specification, reference will be made to temperature in the examples. It will be understood that the present invention applies to the monitoring of other environmental conditions also. Furthermore, in the examples given, the present invention is discussed in terms of vaccines and medicaments however this is only illustrative of one use of the invention and the invention could be applied to foodstuffs, chemicals or other items that are perishable and require cold chain storage. The invention is not limited to vaccines or medicaments unless otherwise so restricted in the claims.

SUMMARY OF THE INVENTION

According to the invention there is provided a system for monitoring the cold chain integrity of at least one packet of environmentally sensitive goods, the system comprising:
  a monitoring unit applied directly to the packet, the monitoring unit comprising: an environmental sensor monitoring an environmental condition to which the goods in the packet are subjected to and outputting environmental condition data, a monitoring unit memory to store the environmental condition data output by the environmental sensor, a microprocessor, an optical output device for conveying the environmental condition data stored in monitoring unit memory, an optical output device trigger responsive to a triggering event and operable to cause the optical output device to begin conveying the environmental condition data, and a power supply;
the system further comprising:
  a camera operable to capture the environmental condition data conveyed by the optical output device; a memory for storing the environmental condition data captured by the camera; and a processor for analysing the environmental condition data stored in memory.

By having such a system, it will be possible to individually monitor the goods in a very cost effective manner. Specialised, expensive, dedicated equipment such as RFID readers are not required to interrogate the monitoring device. Instead, all that is required to interrogate the monitoring device is a camera to capture the data which is conveyed by an optical output, a memory to store the conveyed data and a processor to analyse the stored conveyed data. There are several devices, including ubiquitous devices such as mobile telephones equipped with a camera (including smart phones), and other devices such as computing tablets, so called "phablets", personal digital assistants (PDAs) equipped with a camera, laptops equipped with a camera or having an integrated camera, and personal computers equipped with a camera or having an integrated camera that are capable of being used to interrogate and analyse the environmental conditions data. Indeed, these devices may be used to capture the environmental conditions data and communicate that data to a remote location for analysis if desired. As a result of this improvement, the cost of the monitoring devices is significantly reduced and indeed the interrogating devices may already be readily available in the existing infrastructure. Finally, the mode of communication of the environmental conditions data is such that it is envisaged that the power requirement of the monitoring device will be reduced compared with known solutions thereby extending the battery life and useful application of the invention.

In one embodiment of the invention there is provided a system in which the camera and memory are components of a mobile telephone. Mobile telephones, which will be understood to include smartphones and satellite telephones, are seen as a particularly preferred device to use to interrogate the monitoring device. Mobile telephones are practically universally available and therefore the end user (which in the instance of a medicament will be a healthcare professional) will have the means already at their disposal to check whether or not the good's cold chain integrity is intact.

In one embodiment of the invention there is provided a system in which the processor is a component of the mobile telephone. It is envisaged that the processor will preferably be provided by the mobile telephone. It is possible to transmit the environmental conditions data to a remote location however if the mobile telephone is provided with the appropriate software (for example an "App") to analyse the environmental conditions data, using the mobile telephones processor may be preferred as the analysis will not be dependent on a network signal being available and the result of the analysis will be practically instantaneous.

In one embodiment of the invention there is provided a system in which the processor is located remotely from the monitoring unit, the camera and the memory. In some instances, it may be preferable to carry out processing remotely. For example, it may be preferable for anti-counterfeiting measures to require that the decoding of the bit stream of environmental conditions data that is retrieved is analysed remotely. Furthermore, by analysing the data remotely the verification of the products integrity can be done by the manufacturers. Indeed, a combination of the two systems could be used, processing on the device and processing remotely, and this could be dependent on network coverage or other criteria such as cost or level of data analysis required.

In one embodiment of the invention there is provided a system in which the optical output device comprises a light emitting diode (LED). This is seen as a particularly effective device to use as the optical output device. It is simple, reliable and cost effective to use.

In one embodiment of the invention there is provided a system in which the optical output device comprises a plurality of light emitting diodes (LEDs). If there are a plurality of LEDs, the LEDs can be provided in an array and the data transfer of environmental conditions data can be significantly sped up. Furthermore, the visual information provided to the users will be simple to understand.

In one embodiment of the invention there is provided a system in which the optical output device trigger comprises a photocell. This is seen as a particularly preferred device for use in activating the optical output device. The photocell can be activated by varying the intensity of light incident thereon and in this way, the optical output device can be triggered without difficulty in any place where there is a sufficient light source.

In one embodiment of the invention there is provided a system in which the monitoring unit power supply comprises a rechargeable battery and a charging unit, and in which the photocell is connected to the charging unit. Again, the photocell can be used to capture energy from the light incident thereon, convert that light to an electric current which in turn can be used to charge the rechargeable battery.

In one embodiment of the invention there is provided a system in which the microprocessor is programmed to monitor the triggering event that the optical output device trigger is subjected to and thereafter select one of a plurality of environmental condition data formats to be conveyed by the optical output device.

This is seen as a particularly preferred implementation of the present invention. It is envisaged that it may be preferable to provide a simple visual indicator to the end user as to whether or not the goods are suitable for use as the environmental condition data format. For example, when triggered, a simple green-coloured LED can be left on for a period of time which is indicative to the end user that the goods are still ok to use whereas a red-coloured LED could be left on for a period of time which would be indicative to the end user that the goods are past their best, are ineffective, or indeed are dangerous to use. Similarly, an orange or other coloured LED could be used to indicate a reduction in efficacy and/or that further investigation may be required. On the other hand, a more detailed analysis could be required in some instances. For example, if the goods were spoiled and it was desirable to determine where in the cold chain the failure occurred to allow future corrective action to be taken, a more detailed analysis with environmental conditions and time stamping of data entries would be required as the environmental condition data format. By entering the correct triggering event, the required environmental condition data format can be retrieved and displayed/conveyed by the optical output device.

In one embodiment of the invention there is provided a system in which there are two environmental data formats that can be conveyed by the optical output device, an environmental condition summary format suitable for end users of the goods and an environmental condition detailed format suitable for analysis by cold chain integrity professionals.

In one embodiment of the invention there is provided a system in which a microcontroller is provided instead of the microprocessor.

In one embodiment of the invention there is provided a system in which the monitoring unit is further provided with a communications module having means for transmitting the environmental condition data to the processor for analysing environmental condition data. The communications module may be wired or wireless and can be used as a primary or a backup communications methodology.

In one embodiment of the invention there is provided a system in which the monitoring unit is constructed as a single integrated circuit that is in turn applied directly to the packet. This is seen as a cost effective way of manufacturing the monitoring unit.

In one embodiment of the invention there is provided a system in which the environmentally sensitive goods comprise a medicament. By medicament, this is intended to include vaccines and medication. The present invention is seen as particularly suitable for application in the field of monitoring the efficacy of medicaments.

In one embodiment of the invention there is provided a method of monitoring the cold chain integrity of at least one packet of environmentally sensitive goods using the system according to the invention, the method comprising the steps of:

an end user subjecting the optical output device trigger to a first triggering event;
the end user capturing with the camera the environmental condition data conveyed by the optical output device in response to the first triggering event;
storing the environmental condition data captured by the camera in memory; and
the processor analysing the environmental condition data in memory and determining whether or not the cold chain integrity has been kept intact.

By having such a method, the cold chain integrity can be verified in a simple and efficient manner. By using a camera, the cost of monitoring the cold chain integrity of at least one packet of environmentally sensitive goods will be significantly reduced and the cost of the monitoring devices can also be reduced compared with competing offerings.

In one embodiment of the invention there is provided a method in which the step of capturing the environmental condition data conveyed by the optical output device with the camera comprises capturing a bit stream output by the optical output device with the camera. The optical output device can be used to convey a coded bit stream by sequencing one or more LEDs on and off in rapid succession. For example, the light on could represent a binary "1" whereas the light off could represent a binary "0". This would be a readily programmable method and would allow for the use of very simple apparatus.

In one embodiment of the invention there is provided a method in which the processor is a remote processor and the method comprises the intermediate step of transmitting the environmental condition data to the remote processor.

In one embodiment of the invention there is provided a method in which the method comprises the steps of:

the end user subjecting the optical output device trigger to a second triggering event; and
the end user thereafter capturing the environmental condition data conveyed by the optical output device with their naked eye, the environmental condition data being indicative of whether or not the cold chain integrity has been kept intact.

For example, the second triggering event may trigger an environmental condition summary format in which an LED or other optical output device is activated to demonstrate in simple yes/no terms whether or not the goods are spoiled or whether or not they are fit for use.

In one embodiment of the invention there is provided a method in which the optical output device trigger is a photocell and the step of the end user subjecting the optical output device trigger to a first triggering event comprises subjecting the photocell to a first sequence of alternating light intensities. This is seen as particularly effective as it is envisaged that a light source will be available everywhere and it will be simple for the end user to alter the light intensity incident on the photocell. For example, the end user could simply place their digit over the photocell when they wish to block the light incident on the photocell and reduce the light intensity incident on the photocell.

In one embodiment of the invention there is provided a method in which the optical output device trigger is a photocell and the step of the end user subjecting the optical output device trigger to a second triggering event comprises subjecting the photocell to a second sequence of alternating light intensities. This is seen as a simple way to provide instructions to the optical output device trigger that a particular type of environmental condition data format (summary or detailed) is required by the end user.

In one embodiment of the invention there is provided a method in which the photocell is subjected to the sequence of alternating light intensities by subjecting the photocell to a bright light and thereafter selectively covering or uncovering the photocell thereby blocking the light incident thereon or allowing the light to be incident thereon.

In one embodiment of the invention there is provided a method in which the photocell is selectively covered and uncovered by the end user passing their digit over the photocell.

In one embodiment of the invention there is provided a method in which the photocell is subjected to the sequence of alternating light intensities by operating the flash sequentially on a camera equipped mobile telephone. This is seen as a useful way of activating the optical output device trigger. Indeed, by using the flash, it is envisaged that the sequencing of the flash can be quite complex (as it will be software driven by the user activating a software application on the mobile telephone) and therefore as more complex triggers can be used, less false activations will occur.

In one embodiment of the invention there is provided a method in which the photocell is subjected to the sequence of alternating light intensities by displaying images of differing light intensity sequentially on the screen on a camera equipped mobile telephone. By using the screen, again, a more complex sequence can be used which will result in less false activations and indeed different colour codes could be used for device activation.

In one embodiment of the invention there is provided a method in which the photocell is covered with a simple opaque adhesive backed label. This label can be peeled back thus exposing the photocell to ambient light. As the label shields the photocell from ambient light conditions, this approach leads to a simplification in the trigger mechanism useful in some implementations of the invention.

In one embodiment of the invention the data conveyed by the optical output device comprises a unique serial number which can be used to confirm product authenticity.

In one embodiment of the invention there is provided a monitoring unit for use in the system.

BRIEF DESCRIPTION OF THE DRAWINGS

The invention will now be more clearly understood from the following description of some embodiments thereof given by way of example only with reference to the accompanying drawings, in which:—

DETAILED DESCRIPTION OF THE DRAWINGS

Figure 1:
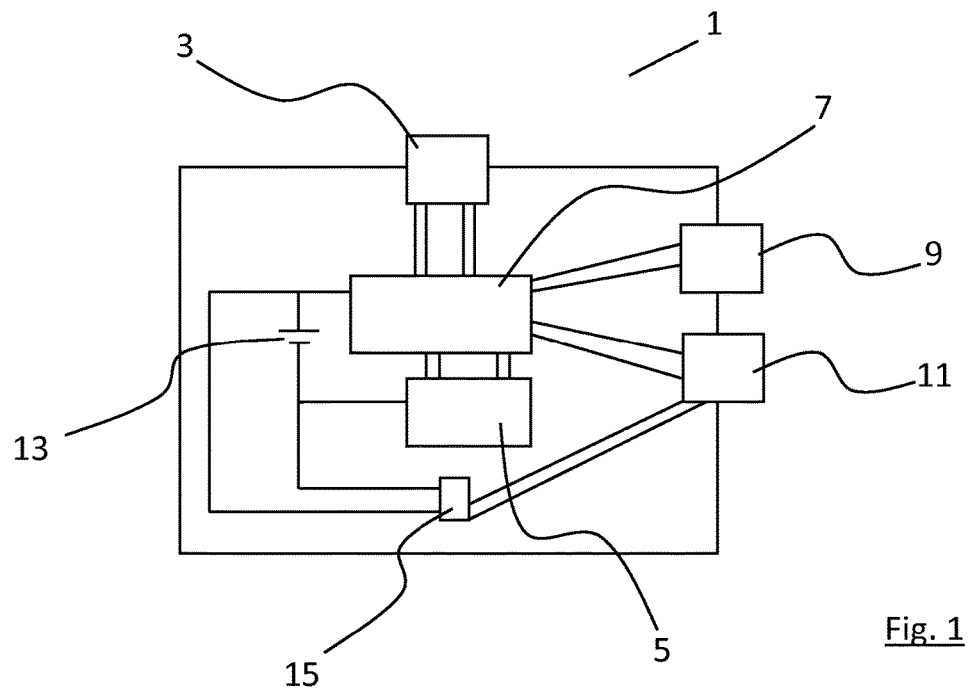
FIG. 1 is a diagrammatic representation of a monitoring device forming part of the system according to the invention.

Referring to FIG. 1, there is shown a diagrammatic representation of a monitoring device forming part of the system according to the invention, indicated generally by the reference numeral 1. The monitoring device 1 is applied directly to a packet (not shown) containing goods to be monitored. The monitoring device 1 comprises an environmental sensor 3 monitoring an environmental condition to which the goods in the packet are subjected to and outputting environmental condition data, a monitoring unit memory 5 to store the environmental condition data output by the environmental sensor 3, a microprocessor 7, an optical output device 9 for conveying the environmental condition data stored in monitoring unit memory 5, an optical output device trigger, in this case a photocell 11, that is responsive to a triggering event and operable to cause the optical output device 9 to begin conveying the environmental condition data, and a power supply 13. The power supply 13 comprises a rechargeable battery and there is further provided a battery charging unit 15. The photocell 11 is connected to the battery charging unit 15 so that the light incident on the photocell, as well as acting as a triggering event, can be used to recharge the battery 13.

Figure 2:
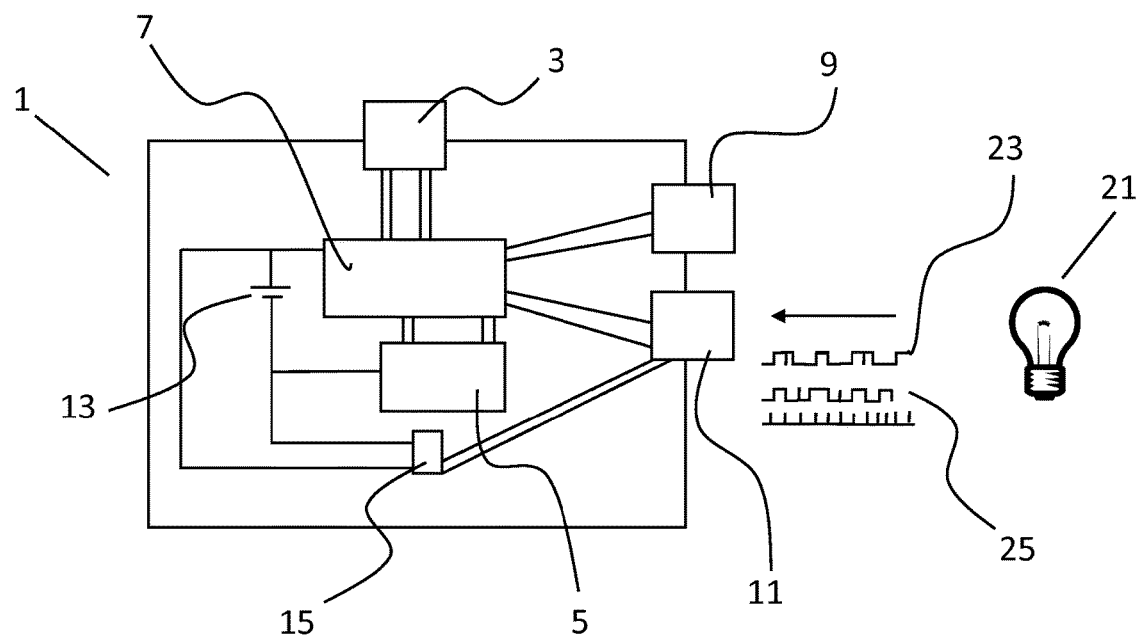
FIG. 2 is a diagrammatic representation of the monitoring device of FIG. 1 receiving an optical output device triggering action.

Referring to FIG. 2, there is shown a diagrammatic representation of the photocell 11 of the monitoring device 1 receiving an optical triggering action. In this case, a light source 21 is used to provide the triggering action. The light source can be sequenced on or off for specified periods of time creating a bit sequence, represented by waveforms 23, 25. The photocell 11 receives this bit sequence and transfers the bit sequence to the microprocessor 7 where the bit sequence will be analysed and compared with triggering events stored in memory 5. It will be understood that only one of the bit sequences 23, 25 will be transmitted at one time. If the bit sequence 23, 25 received by the photocell matches a triggering event bit sequence in memory, the microprocessor will cause the monitoring device 1 to perform a certain action depending on that bit sequence 23, 25.

For example, the bit sequence 23, 25 may be representative of an initialisation sequence requesting the monitoring unit 1 to begin monitoring the surrounding environment. This would be implemented once the goods had been packaged in the packet and prior to the goods leaving the manufacturing facility. It is envisaged that in order to preserve battery life and prevent false readings in the manufacturing facility prior to the goods being packaged in the packets, this initialisation step would be useful. Furthermore, the initialisation sequence or another alternative programming sequence may be used to program the environmental conditions parameters being monitored and the acceptable limits of those environmental conditions for the goods associated with the packet to which the monitoring device has been applied. The bit sequence 23, 25 may also be used to input a unique serial number for later authentication as described above.

Alternatively, the bit sequence 23, 25 may be representative of a first triggering event in which case the monitoring unit 1 is requested to convey an environmental condition data detailed format suitable for analysis by cold chain integrity professionals. In that case, the microprocessor 7 will instruct the optical output device 9, in this case a light emitting diode (LED) to sequence on and off to convey the detailed environmental condition data stored in memory.

It will be understood that the LED output is effectively modulated to convey the data as an output bit sequence where "LED on" will be representative of a binary "1" and "LED off" will be representative of a binary "0". Other more complex methodologies such as transitioning the LED a predetermined number of times to indicate a binary "1" or "0" respectively or using certain LED colours to represent different bit values could be used instead of the method described above. This data represented as an output bit sequence will be captured by a camera (not shown) for subsequent analysis. This "detailed" format will be useful as the entire history of the cold chain will be conveyed and if there has been a break in the cold chain integrity, the end user will be able to determine when the break occurred so that it can be rectified in due course.

Alternatively, the bit sequence 23, 25 may be representative of a second triggering event in which case the monitoring unit is requested to convey an environmental condition summary format suitable for end users of the goods. The end users will be able to identify this summary format with the naked eye. In that case, the microprocessor will instruct the optical output device 9 to remain on for a predetermined period of time, and this may include displaying a particular colour of the LED depending on the environmental condition data stored in memory. For example, the optical output device 9 may display a green light for three seconds if the cold chain integrity is intact and a red light for three seconds if the cold chain integrity has been broken. This "summary" format will be useful for medical practitioner end users that simply wish to know whether or not it is safe to dispense a medicament or administer a vaccine. They are unconcerned when and what the break, if any, in the cold chain integrity was. They simply wish to know whether they can use the goods.

Figure 3:
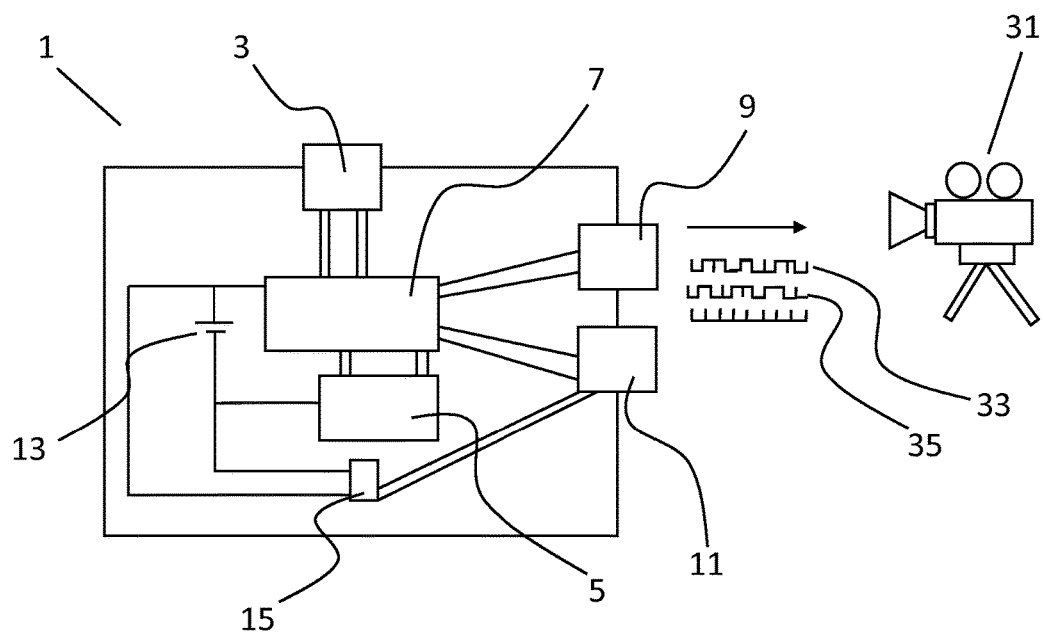
FIG. 3 is a diagrammatic representation of a camera capturing the environmental condition data.

Referring to FIG. 3, there is shown a diagrammatic representation of a camera 31 capturing the environmental condition data. The optical output device 9, once instructed to do so by the microprocessor 7, will begin conveying the environmental condition data stored in memory 5 as an output bit stream 33, 35. The output bit stream 33, 35 may be a detailed format or a summary format of the environmental condition data depending on the instructions received by the microprocessor or indeed may represent other data stored in memory 5 such as data that could be used to authenticate the goods and/or data relating to the time of manufacture, place of manufacture, use-by dates and the like.

Figure 4:
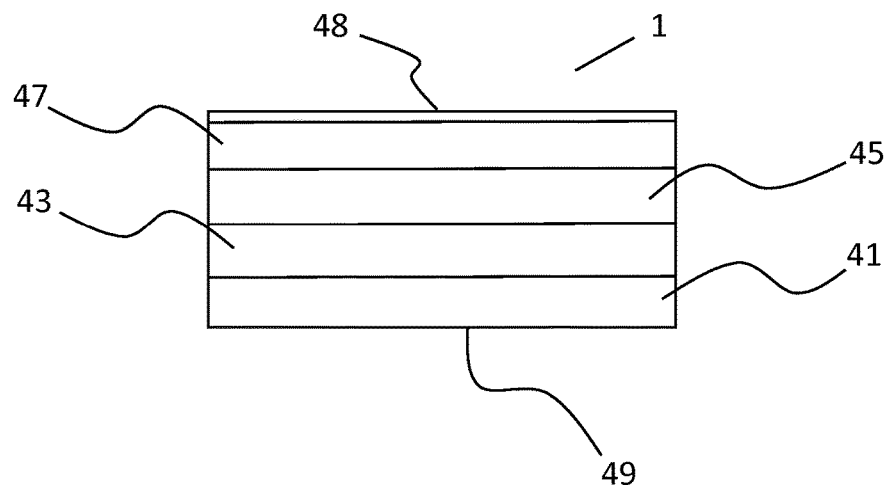
FIG. 4 is a diagrammatic representation of the structure of a monitoring device.

Referring to FIG. 4, there is shown a diagrammatic representation of the structure of a monitoring device 1. The monitoring device 1 will preferably be fabricated as an integrated circuit so that it can be applied as a "microdot" onto the goods packaging. The monitoring device 1 will have a plurality of layers including a sensor 3 layer 41 located at the base 49 of the monitoring device adjacent to the packet (not shown) in which the product is contained, a battery 13 layer 43, and an electronics layer 45 containing the microprocessor 7, the memory 5 and the battery charging unit 15. Adjacent the surface of the monitoring device 1 there is provided an optics layer 47 containing the optical output device 9 (the LED) and the optical output device trigger 11 (the photocell) which are in turn covered by a filter layer 48 which will protect the photocell 11 and optical output device 9 below. The base 49 of the monitoring device 1 will preferably be permeable to the environmental condition being monitored by the device. For example, if the monitoring device is measuring temperature, the base 49 will preferably be constructed from a material with good thermal conductivity. The specific arrangement of layers or components may be varied depending on the manufacturing techniques relied upon. The entire monitoring device may be constructed on a flexible substrate if desired.

Figure 5:
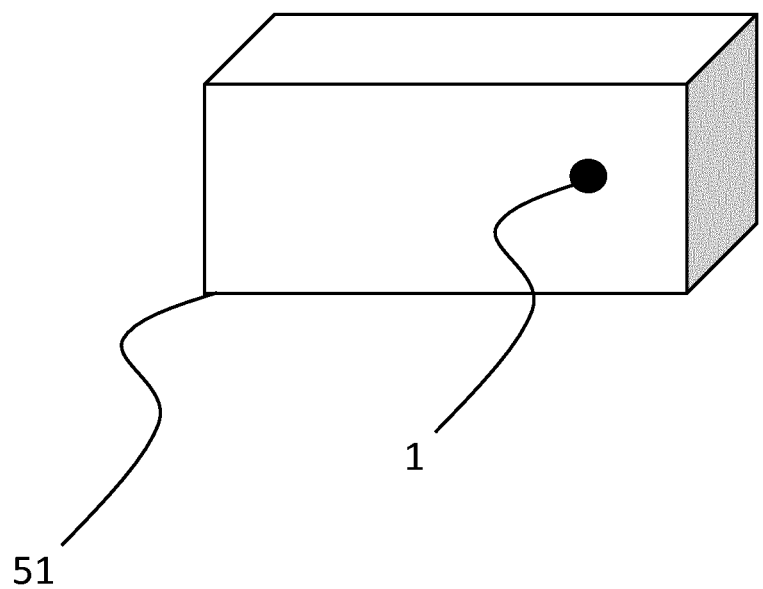
FIG. 5 is a diagrammatic representation of the monitoring device applied to a packet.

Referring to FIG. 5, there is shown a diagrammatic representation of the monitoring device 1 applied to a packet 51. The sensor layer 41 is located adjacent the product whereas the optics layer 47 and filter layer 48 will be facing externally remote from the packet 51.

Figure 6:
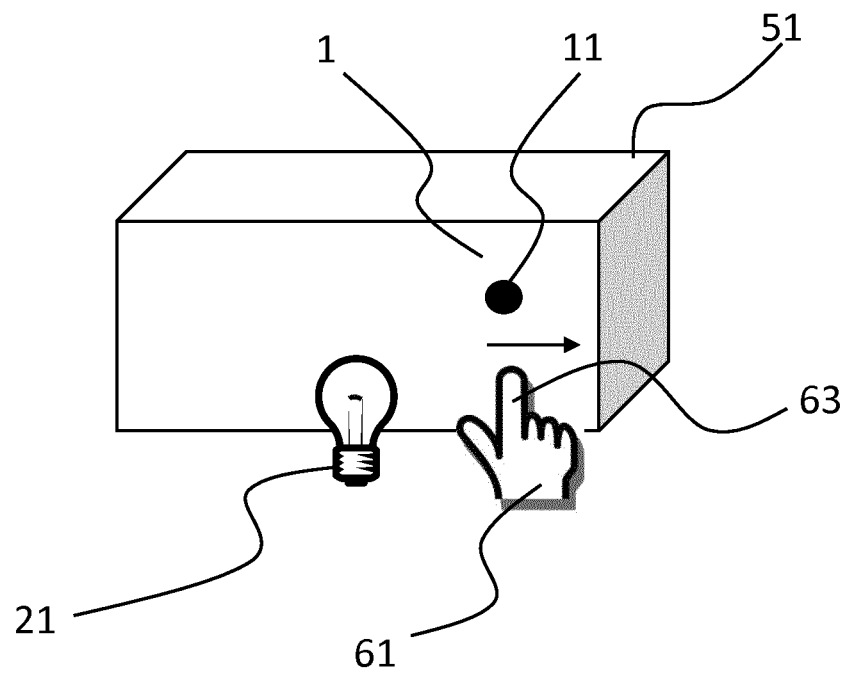
FIG. 6 is a diagrammatic representation of the optical output device trigger being subjected to a first triggering event.
Figure 7:
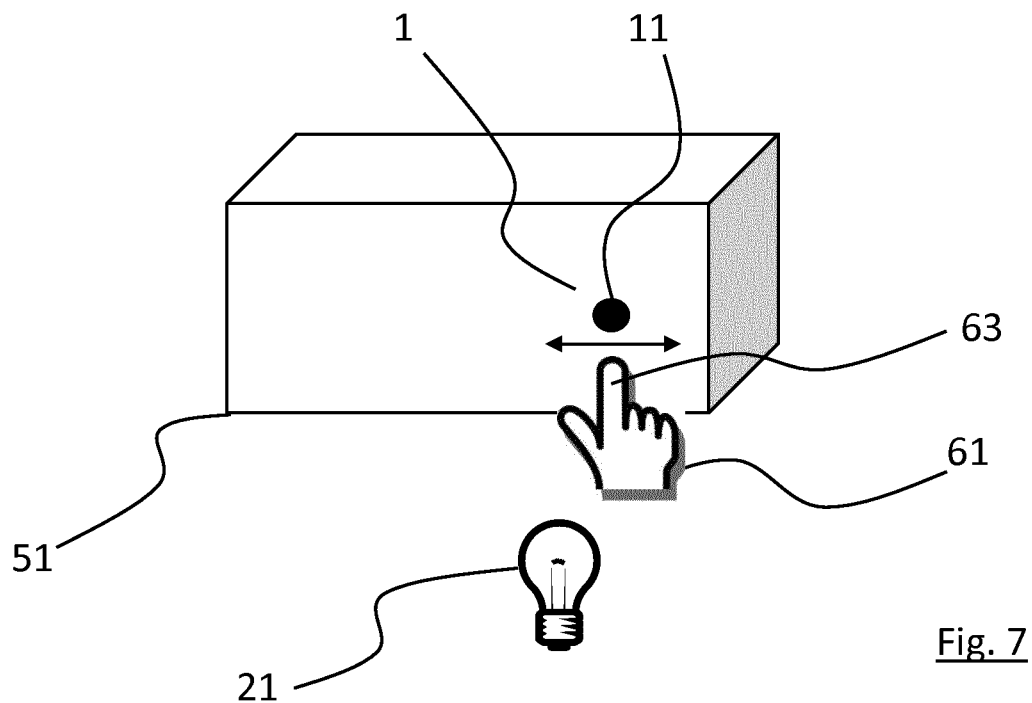
FIG. 7 is a diagrammatic representation of the optical output device trigger being subjected to a second triggering event.

Referring to FIGS. 6 and 7, there is shown a pair of diagrammatic representations of the optical output device trigger 11 being subjected to a first and second triggering events respectively. The optical output device trigger 11 is activated by providing a predetermined sequence of light incident thereon. A light source 21 is provided and an end user passes a digit 63 on their hand 61 over the optical output device trigger 11 to block the light from the light source 21. When the digit 63 is removed from in front of the optical output device trigger 11, the light from the light source 21 will be incident on the optical output device trigger 11 once more. By covering and uncovering the optical output device trigger 11 with their digit in a predetermined sequence, the monitoring device 1 can be triggered into action.

The triggering sequences can be relatively complex to avoid false operation. For example, the triggering sequence for the first triggering event may be five short bursts of light (for example 0.5 seconds in duration each) interspersed with four short periods of darkness (again, 0.5 seconds in duration each), followed by a relatively long period of darkness (approx. 2 seconds perhaps) followed by three long bursts of light (each of 2 seconds in duration) interspersed with two short periods of darkness. The triggering sequence for the second triggering event may be two long bursts of light followed by two short bursts of light followed by two further long bursts of light, all separated by short periods of darkness. The exact sequence and timing can be devised and what is important is that it is possible to provide a triggering event with a simple light source and an end users digit 63.

The monitoring device may initially be in a sleep mode and can be "awoken" from that sleep mode by the simple application of a sudden change in the intensity of the light thereon. Thereafter, if the sudden change in light intensity is followed up by one of the predefined sequences, the monitoring device will carry out the acts instructed by the predefined sequence. If on the other hand the initial sudden change in light intensity is not followed up by one of the predefined sequences, the monitoring device will re-enter sleep mode after a pre-defined duration.

Figure 8:
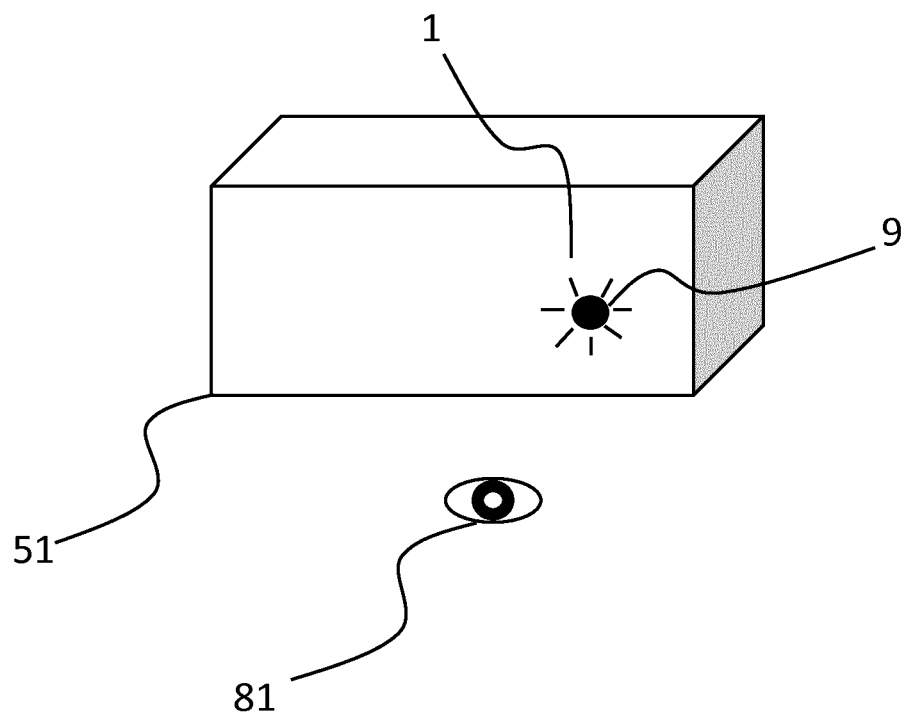
FIG. 8 is a diagrammatic representation of the end user capturing the environmental condition data conveyed by the optical output device with their naked eye.

Referring to FIG. 8, there is shown a diagrammatic representation of the end user capturing the environmental condition data conveyed by the optical output device 9 with their naked eye 81. Having received the appropriate triggering event, the optical output device 9 has been instructed to convey an environmental condition summary format suitable for end users of the goods. In this instance, the optical output device may display a green light for a predetermined duration to indicate that the cold chain integrity is intact or a red light to indicate that the cold chain integrity has been broken. It is envisaged that such a check can be carried out by not only the end user but also by any third party prior to use of the goods. Therefore, as the products are delivered into a pharmacy (for example), the individual products can be checked and similarly, if the products are being shipped to a remote location, a number of products can be checked at random by personnel responsible for the safe transit of the goods.

Figure 9:
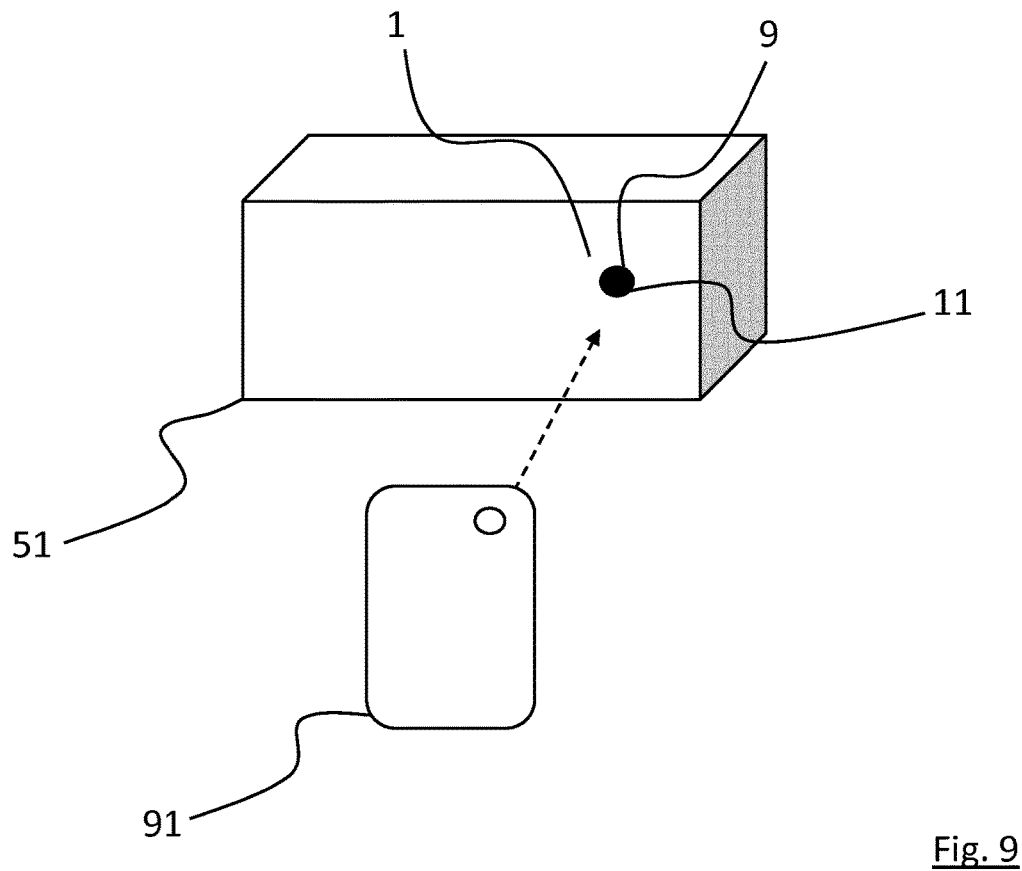
FIG. 9 is a diagrammatic representation of the optical output device trigger being subjected to a triggering event.
Figure 10:
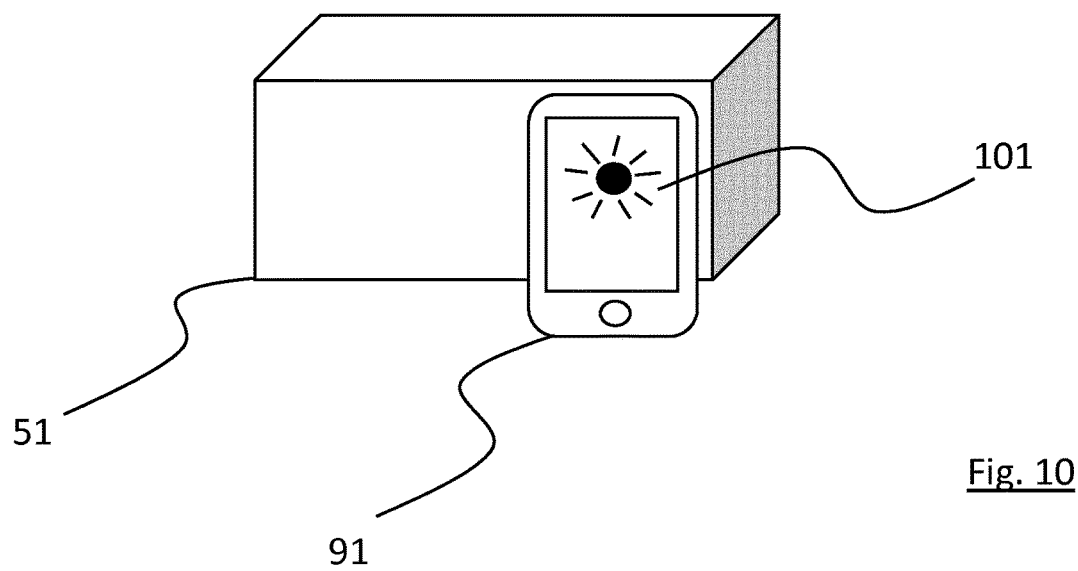
FIG. 10 is a diagrammatic representation of the camera of a mobile telephone capturing the environmental condition data conveyed by the optical output device.

Referring now to FIGS. 9 and 10, there is shown a diagrammatic representation of the optical output device trigger 11 being subjected to a triggering event and a diagrammatic representation of the camera 31 of a mobile telephone 91 capturing the environmental condition data conveyed by the optical output device 9. Referring first of all to FIG. 9, the screen (not shown) of the mobile telephone is presented to the monitoring device and a light sequence is displayed on the screen of the mobile telephone 91 to provide the trigger event. As an alternative to using the screen, the flash of the mobile telephone's camera could be used to provide the triggering event. This sequence of the flash or of the screen will be controlled by software running on the mobile telephone. Referring now specifically to FIG. 10, the mobile telephone's camera is used to capture the output bit sequence 33, 35 emanating from the optical output device 9 of the monitoring device 1. The output bit sequence 33, 35 may be displayed simultaneously and/or subsequently on the user interface 101 of the mobile telephone 91. If displayed simultaneously, this will assist in correct alignment of the camera of the mobile telephone with the optical output device 9.

Figure 11:
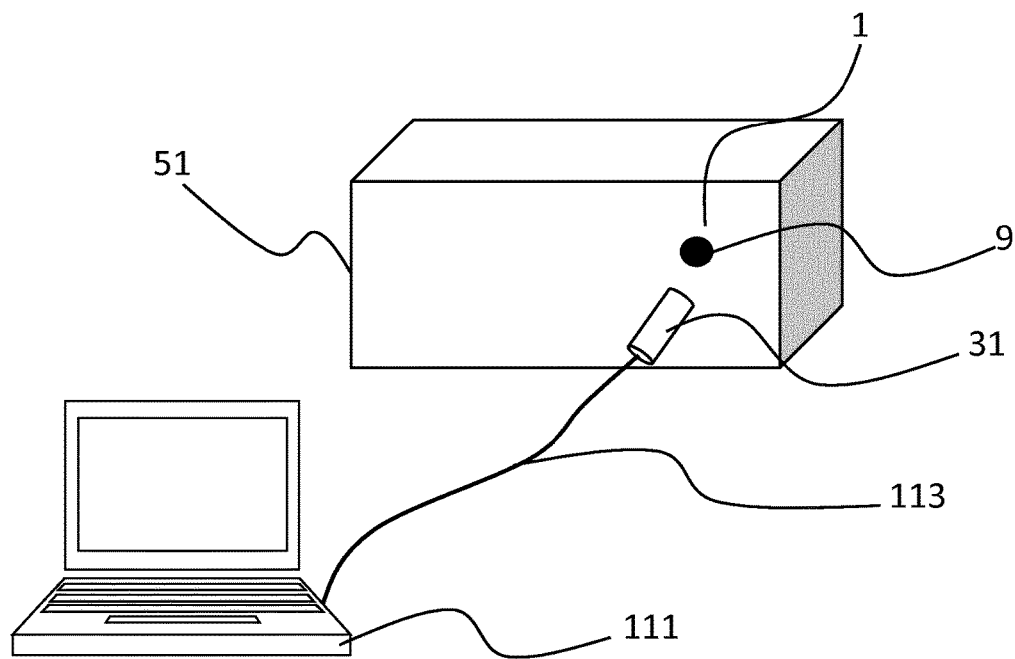
FIG. 11 is a diagrammatic representation of the camera connected to a laptop capturing the environmental condition data conveyed by the optical output device.

Referring to FIG. 11, there is shown a diagrammatic representation of the camera 31, in this case a web cam, connected to a laptop 111, capturing the environmental condition data conveyed by the optical output device 9 of the monitoring unit 1. There is provided a wired connection 113 between the camera 31 and the laptop 111. Alternatively, a wireless connection between the camera 31 and the laptop 111 could be provided. The camera captures the output bit sequence 33, 35 and passes that output bit sequence to the laptop 111 for further analysis. In a further alternative, instead of a camera 31, the device connected to the laptop may in fact be an optical probe or light source used to charge the battery of the monitoring device and/or provide programming instructions or mission customization and/or initialization instructions to the monitoring device. It will be understood that such an optical probe, controlled by the laptop 111, can provide complex modulated signals to the monitoring device 1.

Figure 12:
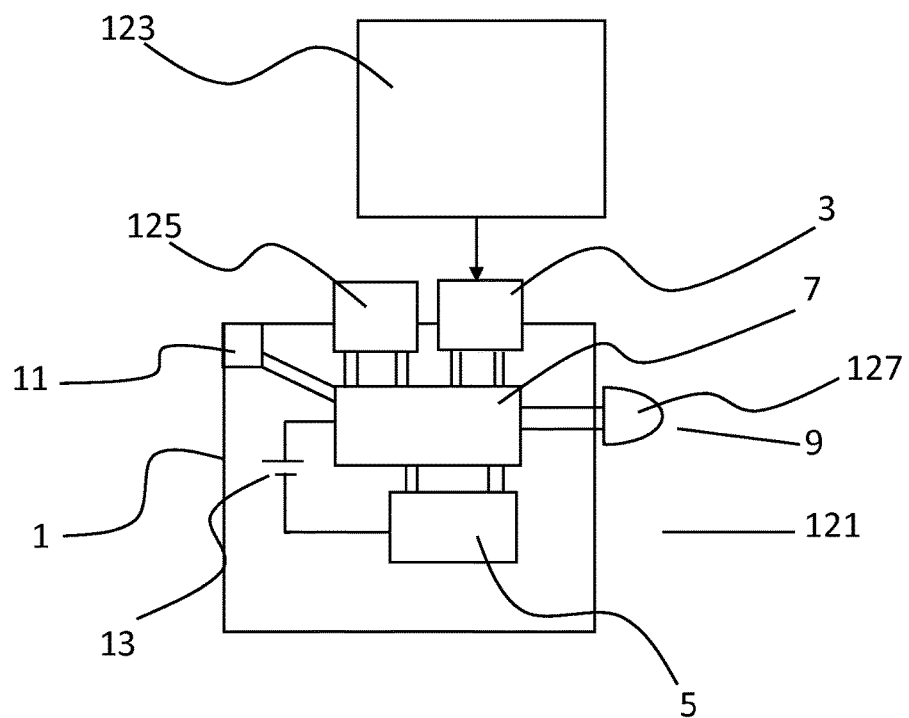
FIG. 12 is a diagrammatic representation of the monitoring device's environmental sensor receiving environmental condition data.

Referring to FIG. 12, there is shown a diagrammatic representation of an alternative construction of monitoring device 121 according to the invention with the environmental sensor monitoring the environment, represented by block 123. In the diagram, like parts have been given the same reference numerals as before. The monitoring device 121 comprises a plurality of environmental sensors 3, 125. For example, sensor 3 is a temperature sensor whereas sensor 125 is a humidity sensor. More sensors could be provided to monitor the same environmental condition (e.g. as a backup) or a different environmental condition. The monitoring device comprises a microprocessor 7, a memory 5 and a power supply 13 as well as an optical output device trigger 11. The optical output device 9 is provided by way of a light emitting diode 127. In the embodiment shown, the device is not provided with a rechargeable battery and a battery charging circuit 15 and therefore, power management will be at a premium. It is envisaged that the device will operate predominantly in sleep mode, awakening only to take environment readings and/or to convey the environmental condition data. In addition to the foregoing, a port for communication with an external processor through a wired or a wireless connection (e.g. through means other than the optical output communication method described above) could also be provided.

Figure 13:
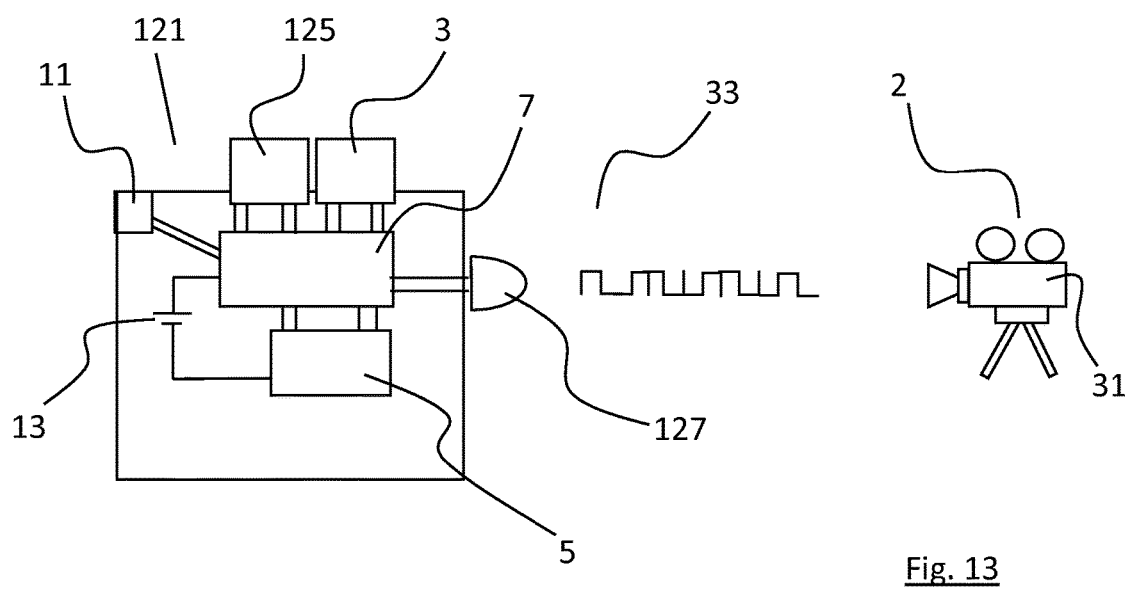
FIG. 13 is a diagrammatic representation of a camera capturing the environmental condition data conveyed by the optical output device.

Referring to FIG. 13, there is shown a diagrammatic representation of a camera 31 capturing the environmental condition data conveyed as an output bit sequence 33 by the optical output device 127 of the monitoring device 121.

Figure 14:
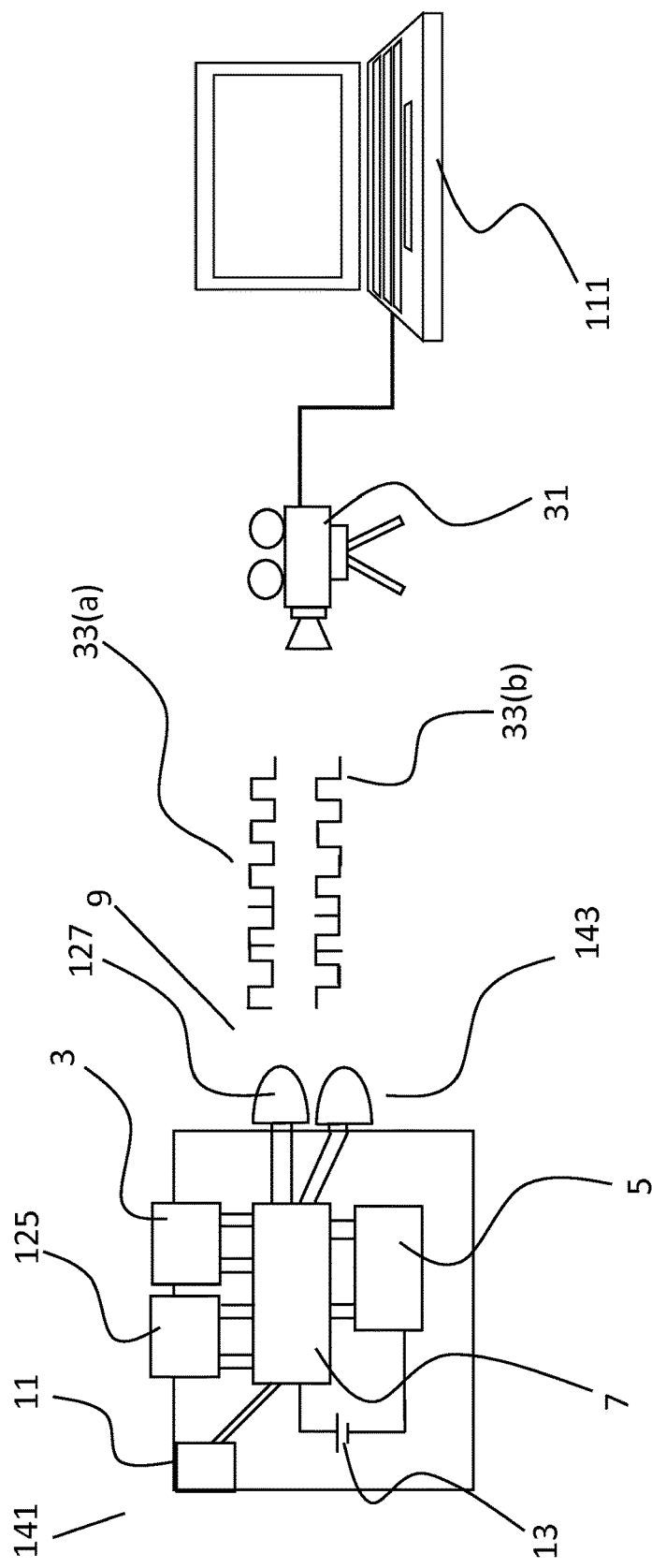
FIG. 14 is a diagrammatic representation of a camera capturing the environmental condition data conveyed by the optical output device comprising two LEDs.

Referring to FIG. 14, there is shown a diagrammatic representation of a camera 31 capturing the environmental condition data conveyed by the optical output device 9 of another embodiment of monitoring device, indicated generally by reference numeral 141, in which like parts have been given the same reference numeral as before. In the embodiment shown, the optical output device 9 comprises a pair of LEDs 127, 143 co-operating with each other to convey the environmental condition data. By having two LEDs 127, 143, the amount of data that can be conveyed at one time can be increased. For example, with two monochrome LEDs, it is possible for the LEDs to convey four possible states/bit values compared to two for a single LED. This will speed up data transfer significantly. Similarly, more than two LEDs could be provided in an array and indeed multi-coloured LEDs could be provided to increase the data transfer rate. In the embodiment shown, the output bit streams 33(a) and 33(b) are identical however this is not normally or necessarily the case and different bit streams from the two LEDs will usually occur. The output bit streams 33(a) and 33(b) are captured by the camera 31 and transferred to the laptop 111 for further analysis.

Figure 15:
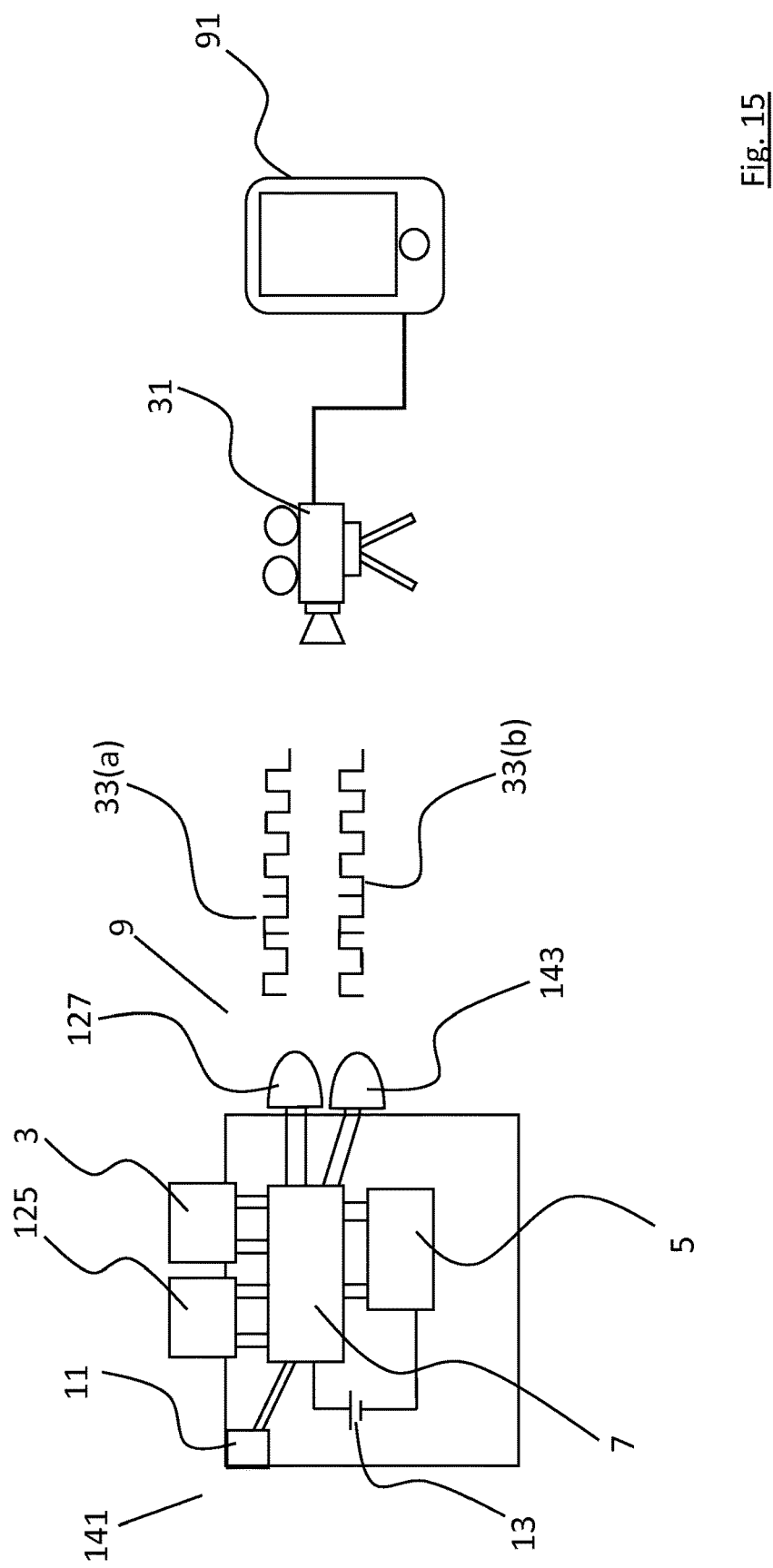
FIG. 15 is a diagrammatic representation of a camera of a mobile telephone capturing the environmental condition data conveyed by the optical output device of the monitoring unit.

Referring to FIG. 15, there is shown a diagrammatic representation similar to FIG. 14 of a camera 31 connected to a mobile telephone 91 for capturing the environmental condition data conveyed by the optical output device 9 of the monitoring unit 141. Although the camera 31 is shown as a separate device, it will be understood that it will usually be formed integrally with the mobile telephone. The data conveyed to the mobile telephone may then be transmitted to a remote location over the internet or mobile communications network for processing and analysis or may be processed and analysed on the mobile telephone itself. The mobile telephone will have memory for storage of environmental conditions data received. Many of the currently available smartphones have sufficient memory and processors capable of processing this data with relative ease.

It will be understood from the foregoing that the monitoring device can perform a sophisticated product monitoring mission and allow a simple product integrity check to be performed at any time without the need for specialized equipment. Furthermore, it has been demonstrated how the monitoring device also supports a more complete product (goods) integrity check by optically uploading data from memory for further analysis and reporting.

Another problem addressed by the present invention is that of counterfeit goods that may be inserted into a supply chain. An additional important application of this invention lies in the area of confirmation of product authenticity. While printed barcodes and the like can be easily forged, the custom electronic device described herein cannot. The invention allows the device to be loaded with a unique serial number at the time of its manufacture. The unique serial numbers can also encode a Global Trade Item Number (GTIN) which will enhance distribution logistics.

Various modifications could be made to the embodiments hereinbefore described without departing from the scope of the present invention. For example, instead of LEDs, other devices such as small scale displays, liquid crystal displays (LCDs) and the like could be used instead. However, the LEDs are seen as particularly useful due to their robust nature, low cost and low power requirement. As an alternative to the photocell for the optical output device trigger, it is envisaged that it may be possible to use an electronic switch or other electromechanical or mechanical switch. Indeed, the trigger may be programmed in software to trigger the optical output device when requested or periodically. In the embodiments described, the photocell is the optical output device trigger, or in other words, the trigger for the optical output device. It will be understood that the photocell is itself an optical input device.

In the embodiments described, reference is made to an optical output device. It will be understood that what is meant is an "active" optical output device rather than a "passive" optical output device. An "active" optical output device is one in which there is provided an LED, LCD or other optical output device that can change state or can change its visual characteristics depending on the output (effectively, it is a light emitting element) whereas a "passive" optical output device is one in which the visual characteristics do not change irrespective of the environment in which it is in, for example a printed bar code, printed QR code or printed information regarding the goods (e.g. time of manufacture, use-by dates and the like). It will be understood from the foregoing that when referring to the present invention, by optical output device, what is meant is an active optical output device and not a passive optical output device.

In the embodiments described, reference is made to a camera. This will be understood to be a video camera capable of recording an output bit sequence from the optical output device for subsequent analysis and any reference to camera will be understood to refer to a video camera. Although not specifically stated, it will be understood that once the monitoring device has ceased transmission of environmental control data, the camera will cease recording the output.

It is envisaged that the memory on the monitoring device will be limited and may run out of free space over the time of the monitoring of the goods. In such a case, the memory and microprocessor can be programmed to operate a first in, first out (FIFO) system for environmental condition data within acceptable parameters and to permanently store in memory those instances where the cold chain integrity was broken so that this, most important information (i.e. when the cold chain integrity was broken, if at all), will be available to the end user.

The environment condition data is modulated into optical output signals. These optical signals are converted into an encoded bit stream. It will be understood that the processor used to analyse these signals, whether it is remotely located or forms part of a local device such as a mobile telephone, will be provided with the means to decode the encoded bit stream presented by the optical output device and translate the encoded bit stream into meaningful, useful information.

It will be understood from the foregoing that the invention as described is particularly suitable for mass manufacture and can be fabricated in an inexpensive manner and applied to the product packaging with relative ease. The monitoring devices could be adhered retrospectively to the packaging or indeed could be formed integrally with the packaging if desired.

Furthermore, the method of transferring monitored data could find particular use as a backup data transfer methodology in new or existing systems. A primary methodology (e.g. a wired or wireless connection) could normally be used for data transfer between the monitoring device and a processor but if there was a problem with the primary methodology or if the primary methodology was simply unavailable, the present invention could be used to good effect as a secondary data transfer methodology to transfer data from the monitoring device to the end user or to a processor for analysis. Indeed, in many cases, the apparatus will already have many of the components necessary to implement the secondary data transfer methodology according to the present invention such as one or more LEDs, memory and a processor. What is required therefore is suitable programming on the monitoring device to instigate transfer of data from the monitoring device using the methodology described herein.

It will be understood that the principles of the present invention could be applied to other areas outside of cold chain monitoring. For example, the manner in which the data is transferred could have application in a plethora of other disparate fields. The data is conveyed from a device with memory to a camera by encoding the data into a bit stream and thereafter modulating the light from an LED to represent the bit stream. This mode of data transfer could be used in many other electronic devices. For example, this mode of data transfer could be implemented in other computing devices or in memory sticks. The usefulness of the invention in this context applies when the primary wired or wireless means of data transfer fails or is temporarily unavailable.

In this specification the terms "comprise, comprises, comprised and comprising" and the terms "include, includes, included and including" are all deemed totally interchangeable and should be afforded the widest possible interpretation.

The invention is in no way limited to the embodiments hereinbefore described but may be varied in both construction and detail within the scope of the claims.

The invention claimed is:

1. A system for monitoring the cold chain integrity of at least one packet of environmentally sensitive goods, the system comprising:
a monitoring unit applied directly to the packet, the monitoring unit comprising: an environmental sensor monitoring an environmental condition to which the goods in the packet are subjected to and outputting environmental condition data, a monitoring unit memory to store the environmental condition data output by the environmental sensor, a microprocessor, an optical output device for conveying the environmental condition data stored in monitoring unit memory, an optical output device trigger responsive to a triggering event and operable to cause the optical output device to begin conveying the environmental condition data, and a power supply;
the system further comprising:
a camera operable to capture the environmental condition data conveyed by the optical output device;
a memory for storing the environmental condition data captured by the camera; and
a processor for analysing the environmental condition data stored in memory; and in which the optical output device trigger comprises a photocell, and in which the microprocessor is programmed to monitor the triggering event that the photocell is subjected to and thereafter select one of a plurality of environmental condition data formats to be conveyed by the optical output device depending on the triggering event that the photocell is subjected to.

2. The system as claimed in claim 1 in which the camera and memory are components of a mobile telephone.

3. The system as claimed in claim 2 in which the processor is a component of the mobile telephone.

4. The system as claimed in claim 1 in which the processor is located remotely from the monitoring unit, the camera and the memory.

5. The system as claimed in claim 1 in which the optical output device comprises a light emitting diode (LED).

6. The system as claimed in claim 1 in which the optical output device comprises a plurality of light emitting diodes (LEDs).

7. The system as claimed in claim 1 in which the optical output device comprises a liquid crystal display (LCD).

8. The system as claimed in claim 1 in which the monitoring unit power supply comprises a rechargeable battery and a charging unit, and in which the photocell is connected to the charging unit.

9. The system as claimed in claim 1 in which there are two environmental data formats that can be conveyed by the optical output device, an environmental condition summary format suitable for end users of the goods and an environmental condition detailed format suitable for analysis by cold chain integrity professionals.

10. The system as claimed in claim 1 in which a unique serial number can be conveyed by the optical output device.

11. The system as claimed in claim 1 in which the monitoring unit is further provided with a communications module having means for transmitting the environmental condition data to the processor for analysing environmental condition data.

12. The system as claimed in claim 1 in which the monitoring unit is constructed as a single integrated circuit that is in turn applied directly to the packet.

13. The system as claimed in claim 1 in which the environmentally sensitive goods comprise a medicament.

14. A method of monitoring the cold chain integrity of at least one packet of environmentally sensitive goods in a system comprising a monitoring unit applied directly to the packet, the monitoring unit comprising: an environmental sensor monitoring an environmental condition to which the goods in the packet are subjected to and outputting environmental condition data, a monitoring unit memory to store the environmental condition data output by the environmental sensor, a microprocessor, an optical output device for conveying the environmental condition data stored in monitoring unit memory, an optical output device trigger responsive to a triggering event and operable to cause the optical output device to begin conveying the environmental condition data, and a power supply; the system further comprising a camera operable to capture the environmental condition data conveyed by the optical output device; a memory for storing the environmental condition data captured by the camera; and a processor for analysing the environmental condition data stored in memory, the method comprising the steps of:

subjecting, by an end user, the optical output device trigger to a first triggering event;

capturing, by the end user, with the camera the environmental condition data conveyed by the optical output device in response to the first triggering event;

storing the environmental condition data captured by the camera in memory;

analysing, by the processor, the environmental condition data in memory and determining whether or not the cold chain integrity has been kept intact;

subjecting, by the end user, the optical output device trigger to a second triggering event; and capturing, by the end user thereafter, the environmental condition data conveyed by the optical output device with their naked eye, the environmental condition data being indicative of whether or not the cold chain integrity has been kept intact; and in which the optical output device trigger is a photocell and the step of the end user subjecting the optical output device trigger to a first triggering event comprises subjecting the photocell to a first sequence of alternating light intensities and the step of the end user subjecting the optical output device trigger to a second triggering event comprises subjecting the photocell to a second sequence of alternating light intensities.

15. The method as claimed in claim 14 in which the step of capturing the environmental condition data conveyed by the optical output device with the camera comprises capturing a bit stream output by the optical output device with the camera.

16. The method as claimed in claim 14 in which the processor is a remote processor and the method comprises the intermediate step of transmitting the environmental condition data to the remote processor.

17. The method as claimed in claim 14 in which the photocell is subjected to the sequence of alternating light intensities by subjecting the photocell to a bright light and thereafter selectively covering or uncovering the photocell thereby blocking the light incident thereon or allowing the light to be incident thereon.

18. The method as claimed in claim 17 in which the photocell is selectively covered and uncovered by the end user passing their digit over the photocell.

19. The method as claimed in claim 14 in which the photocell is subjected to the sequence of alternating light intensities by operating a flash sequentially on a camera equipped mobile telephone.

20. The method as claimed in claim 14 in which the photocell is subjected to the sequence of alternating light intensities by displaying images of differing light intensity sequentially on a screen on a camera equipped mobile telephone.

21. The method as claimed in claim 14 in which the optical output device trigger comprises a photocell and in which the method comprises an initial step of initializing the monitoring unit by subjecting the photocell to ambient light by removing an adhesive backed label covering the photocell.

22. A monitoring unit, the monitoring unit comprising:

an environmental sensor for monitoring an environmental condition to which the goods in a packet to which the monitoring unit may be attached are subjected to and outputting environmental condition data;

a monitoring unit memory to store the environmental condition data output by the environmental sensor;

a microprocessor;

an optical output device for conveying the environmental condition data stored in monitoring unit memory;

an optical output device trigger responsive to a triggering event and operable to cause the optical output device to begin conveying the environmental condition data; and a power supply, and in which the optical output device trigger comprises a photocell, and in which the microprocessor is programmed to monitor the triggering event that the photocell is subjected to and thereafter select one of a plurality of environmental condition data formats to be conveyed by the optical output device depending on the triggering event that the photocell is subjected to.

* * * * *